United States Patent
Molev-Shteiman (10) Patent No.: US 6,301,288 B1
(45) Date of Patent: *Oct. 9, 2001

(54) METHOD OF CHIP INTERLEAVING IN DIRECT SEQUENCE SPREAD SPECTRUM COMMUNICATIONS

(75) Inventor: Arkady Molev-Shteiman, Bneibrak (IL)

(73) Assignee: Infineon Technologies AG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/515,622

(22) Filed: Feb. 29, 2000

Related U.S. Application Data (63) Continuation-in-part of application No. 08/820,786, filed on Mar. 19, 1997.

(51) Int. Cl.$^7$ ................................................ H04K 1/00
(52) U.S. Cl. .................... 375/140; 375/145; 375/146; 375/367; 370/515
(58) Field of Search .................... 375/130, 140, 375/142, 145, 146, 150, 354, 367; 370/470, 476, 515; 455/63, 138

(56) References Cited

U.S. PATENT DOCUMENTS

| | | | |
|---|---|---|---|
| 5,005,183 | 4/1991 | Carey et al. ......................... | 375/142 |
| 5,267,261 | 11/1993 | Blakeney et al. ..................... | 370/332 |
| 5,274,667 | 12/1993 | Olmstead ............................. | 375/145 |
| 5,315,583 | 5/1994 | Murphy et al. ...................... | 375/145 |
| 5,335,247 | 8/1994 | Olmstead ............................. | 375/130 |
| 5,425,051 | 6/1995 | Mahany ............................... | 375/132 |
| 5,463,657 | 10/1995 | Rice .................................... | 375/150 |
| 5,471,497 | 11/1995 | Zehavi ................................. | 375/142 |
| 5,499,266 | 3/1996 | Yokev et al. ........................ | 375/136 |
| 5,515,396 | 5/1996 | Dalekotzin .......................... | 375/142 |
| 5,535,239 | 7/1996 | Padovani et al. .................... | 370/209 |
| 5,546,420 | 8/1996 | Seshadri et al. ...................... | 370/342 |
| 5,546,422 | 8/1996 | Yokev et al. ........................ | 375/134 |
| 5,581,575 | 12/1996 | Zehavi ................................. | 375/142 |
| 6,061,386 | * 9/2000 | Molev-Shteiman .................. | 375/140 |

OTHER PUBLICATIONS

D.V. Sarwate and M.B. Pursley, "Corsscorrelation Properties of Pseudorandom and Related Sequences," *Proc. of IEEE*, vol. 68, No. 5, pp. 593–619, May 1980.*

Tachikawa et al, "Direct Sequence/Spread Spectrum Communications Systems Using Chip Interleaving and Its Applications for High–Speed Data Transmissions on Power Lines", *Electronics and Communications in Japan, Part 1*, vol. 75, No. 4, pp 46–58 (1992).

Gold et al, "Erasure Bursts and Bit Error Rate In Direct Sequence Spread Spectrum Systems", *5th Annual Inv. Phoenix Conf. Comp. & Com*, pp 63–67 (1986).

Dixon, "Spread Spectrum Systems", *John Wiley & Sons*, N.Y., pp 50–52 (1984).

Tachikawa, "An Effect on Chip interleaving and Hard Limiter against Burst Noise in Direct Sequence Spread Specrum Communication Systems", *IEICE Trans.*, vol. E78A, No. 2 (1995).

Tachikawa, et al, "Spread Time Spread Spectrum Communication Systems", *Globecom*, pp 615–619, (1987).

* cited by examiner

Primary Examiner—Stephen Chin
Assistant Examiner—Chieh M. Fan
(74) Attorney, Agent, or Firm—Mark M. Friedman (57) ABSTRACT

A method of chip interleaving in direct sequence spread spectrum communications. A binary code sequence is chosen to have a length $N=2^k-1$ and to be self-orthogonal. A data string of M=QN+1 bits, QN−1 bits, or QN+S bits, where Q is a positive integer and S is an integer between 1 and N that lacks a common factor with N, is multiplied sequentially with the binary code sequence until N chip frames of M chips each are produced. These chip frames are transmitted to a receiver, and recovered in an equally straightforward manner. The integers Q and N are chosen according to transmission conditions.

14 Claims, 7 Drawing Sheets

METHOD OF CHIP INTERLEAVING IN DIRECT SEQUENCE SPREAD SPECTRUM COMMUNICATIONS

This is a continuation in part of U.S. patent application Ser. No. 08/820,786 filed Mar. 19,1997.

FIELD AND BACKGROUND OF THE INVENTION

The present invention relates to burst noise suppression in digital communications and, more particularly, to an improved method of chip interleaving in direct sequence spread spectrum (DSSS) modulation.

DSSS is a well-known method of suppressing narrow band noise in a digital communications channel. See, for example, Robert C. Dixon, *Spread Spectrum Systems* (John Wiley & Sons, New York, 1984). One familiar example of DSSS is the CDMA protocol of cellular telephony. See, for example, Andrew J. Viterbi, *CDMA: Principles of Spread Spectrum Communications* (Addison Wesley, Reading Mass., 1995) and Ramjee Prasad, *CDMA for Wireless Personal Communications* (Artech House, Norwood Mass., 1996). In DSSS, a message string of data bits is modulated by a pseudorandom binary code sequence to produce the string actually transmitted. If the original message string contains M bits, and each bit is modulated with N chips of the pseudorandom binary code sequence, the resulting chip string contains MN chips, with N sequential chips corresponding to each of the original M bits. At the receiver, the original message string is recovered by multiplying the received chip string by the same binary code sequence as was used to modulate the data bits, thus recovering each bit from the corresponding sequential group of N chips.

Although DSSS provides resistance to narrow band noise, it is vulnerable to time-limited noise bursts. Therefore, the technique of chip interleaving has been developed, to render DSSS signals resistant to both narrow band noise and burst noise. In chip interleaving, one chip is selected from each modulated data bit, and the M chips thus selected are combined to form a chip frame. A total of N chip frames are assembled, each with M chips, each with a different chip from each of the modulated data bits. The N chip frames thus formed constitute, in sequence, the transmitted string, also referred to herein as a "packet". In this way, each data bit is spread over the entire transmitted string instead of being concentrated at one position in the string. At the receiver, the chip selection is inverted to recover the non-interleaved string, which then is multiplied by the binary code sequence as in standard DSSS.

Several methods of chip interleaving are known in the art. Tachikawa et al. (Shin-ichi Tachikawa, Kiyoshi Toda, Takehiro Isikawa and Gen Marubayashi, Direct Sequence/Spread Spectrum Communications System Using Chip Interleaving and its Applications for High-Speed Data Transmissions on Power Lines, *Electronics and Communications in Japan*, Part 1, Vol. 75, No. 4, pp. 46–58 (1992)) use pseudorandom sequences to randomly distribute the M chips of each chip frame. Olmstead (U.S. Pat. Nos. 5,274,667 and 5,335,247) forms a large number of sequentially interleaved chip frames of length M directly, by modulating the data string with a long pseudorandom number, and then pseudo-randomizes the order of the chips in each frame. The chip frames are transmitted until the receiver returns an acknowledgment of having received an uncorrupted message.

SUMMARY OF THE INVENTION

According to the present invention there is provided an improved method for transmitting a number M of data bits from a transmitter to a receiver, the method being of the type in which a plurality of chip frames are formed by multiplying each of the data bits by N of the chips of a pseudorandom binary interleaving code sequence, thereby producing a set of N product chips corresponding to each bit, and interleaving the product chips so that each chip frame includes a unique one of the product chips from each bit, the improvement including the steps of: (a) selecting an integer Q; (b) selecting N to be one less than a power of two; (c) selecting M to be equal to an integer selected from the group of integers consisting of QN+1, QN−1 and QN+S, wherein S is an integer greater than 1, less than N and lacking a common factor with N; (d) providing, at the transmitter and at the receiver, a pseudorandom binary interleaving code sequence, of N chips, selected from the group of sequences consisting of self-orthogonal sequences and approximately self-orthogonal sequences; and (e) sequentially multiplying, at the transmitter, each of the M data bits by each of the N chips of the pseudorandom binary interleaving code sequence, thereby producing a packet of N chip frames, the packet including NM product chips.

The present invention has the advantage over the prior art methods of structural simplicity in both the transmitter and the receiver: as in conventional DSSS, only one pseudorandom binary code sequence, of N chips, is provided. N and M are chosen to satisfy $N=2^k-1$ and M=either QN+1, or QN−1, or QN+S, where k and Q are positive integers and S is an integer, greater than I and less than N, that does not have a common factor with N. The values of Q, N and S are chosen in accordance with the transmission conditions. If necessary, an input data string can be padded with zeros to make it M bits long. The relationship $N=2^k-1$ allows the selection of a pseudorandom binary code sequence whose autocorrelation function is equal to 1 at zero lag and −1/N at all other lags, either exactly or approximately. A sequence that exactly satisfies this condition of having an autocorrelation function equal to 1 at zero lag and −1/N at all other lags is referred to herein as a "self-orthogonal" sequence. The most familiar example of self-orthogonal sequences are the so-called "m-sequences". The set of sequences that approximately satisfy this condition includes the well-known "gold code" sequences. This use of an exactly or approximately self-orthogonal code sequence for modulating the message string confers, on signals transmitted according to the present invention, relative immunity to multipath interference.

There are a large number of pseudo-random sequences with small cross-correlation, so it is straightforward to apply the present invention to a CDMA network.

According to a further aspect of the present invention, the synchronization of the source and the receiver is enhanced by the inclusion, in each chip frame, of a synchronization frame. As is well known, in DSSS communications, for accurate reconstruction of a message string at the receiver, the receiver must be synchronized with the transmitter to within a fraction of the duration of one chip. This conventionally is accomplished by stops that include the cross-correlation of the pseudorandom binary code sequence with the received chip string. If the transmitted string is not interleaved, then, because each group of N sequential transmitted chips corresponds to the same data bit, a usable cross-correlation function is obtained upon the receipt of only N chips. If the transmitted string is interleaved, all MN chips of the received chip string must be cross-correlated with the binary code sequence to produce a usable cross-correlation function. This takes M times as long as cross correlation without interleaving. According to this further aspect of the present invention, as each synchronization frame is received, it is cross-correlated with the binary code sequence. Synchronization is thus made almost as fast as in non-interleaved DSSS, at the expense of a small increase in overall transmission time.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method of DSSS chip interleaving which is simpler than the prior art methods.

The principles and operation of DSSS chip interleaving according to the present invention may be better understood with reference to the drawings and the accompanying description.

At the transmitter, the message string and the pseudorandom binary code sequence usually are stored as strings of bits or chips respectively (0's and 1's). These are combined, in a process referred to above as "modulation", by applying an exclusive or (XOR) operation to bit-chip pairs in which the bit is selected from the message string and the chip is selected from the pseudorandom binary code sequence. The 0 chips of the resulting packet are mapped to +1's, the 1 chips are mapped to −1's, and the packet is imposed on a carrier wave for transmission to the receiver, a process also conventionally called "modulation". At the receiver, the received string is recovered from the carrier wave, in a process conventionally called "demodulation", usually in the form of an unnormalized string of binary integers, with several (e.g., four or eight) bits per integer, with each integer corresponding to one chip of the transmitted packet; but the received string may also be in the form of a string of binary integers with one bit per integer, in which case there is a one-to-one correspondence between the bits of the received string and the chips of the transmitted packet, and, in the absence of noise, the bits of the received string are identical to the chips of the transmitted packet. The pseudorandom binary code sequence also usually is stored at the receiver as a string of binary integers: multi-bit representations of the integers +1 and −1; and this code string is combined with the received string by arithmetic multiplication, although, as in the case of the received string, the pseudorandom binary code sequence string also may be binary integers with one bit per integer, in which case the code string is identical to the pseudorandom binary interleaving chip sequence of the transmitter, and, as at the transmitter, the code string is XOR-ed with the recovered string. For the sake of clarity, in the subsequent discussion, the processes of combining the message string with the pseudorandom binary code sequence at the transmitter and of combining the received string with the pseudorandom binary code sequence at the receiver both are termed "multiplication"; the term "modulation" is reserved for the process of imposing the encoded packet on the carrier wave. Correspondingly, the chips produced by combining the message string with the pseudorandom binary code sequence at the transmitter are referred to herein as "product chips". The integers, corresponding to the product chips, that are recovered at the transmitter are referred to herein as "product integers". The integers of the pseudorandom binary code sequence at the receiver are referred to herein as "code integers". The integers obtained by multiplying the product integers by the code integers at the receiver are referred to herein as "received integers". Note that the two operations, XOR and arithmetic multiplication by a string of +1's and −1's, are equivalent in this context: both two consecutive bit-by-bit XORs of an arbitrary binary string with the same binary string, and two consecutive integer-by integer multiplications of an arbitrary integer string by the same integer string of +1's and −1's, are identity operations.

Figure 1:
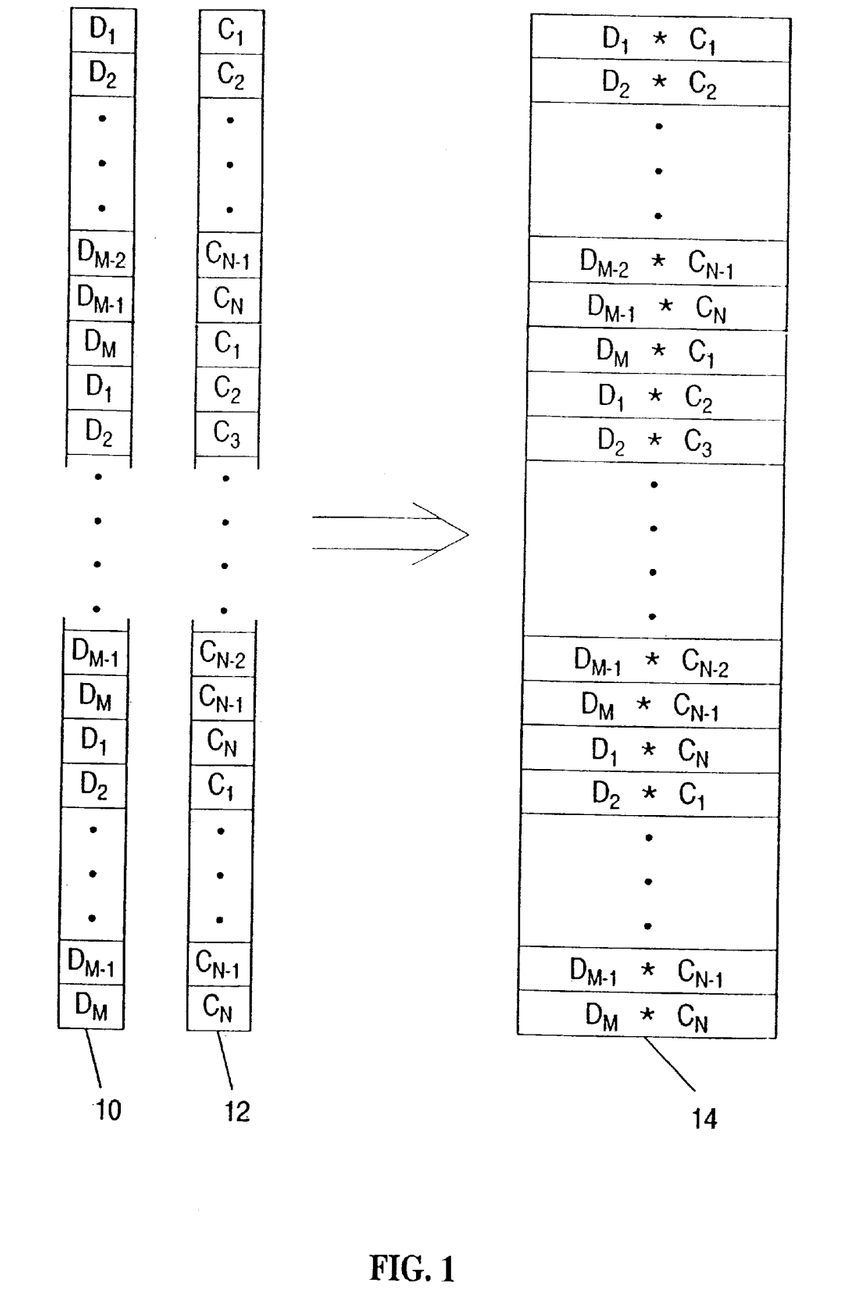
FIG. 1 is a schematic depiction of the interleaved multiplication scheme of the present invention.

Referring now to the drawings, FIG. 1 illustrates the interleaved multiplication of a message string of M bits $D_1$ through $D_M$, using a pseudorandom binary code sequence of N chips $C_1$ through $C_N$, according to the present invention. A string 10 of N duplicates of the message string is shown parallel to a string 12 of M duplicates of the binary code sequence. Multiplying string 10 by the corresponding chips of string 12 produces a product chip string 14 in which the value of each product chip is the result of applying an XOR operation to each pair of inputs. This multiplication operation is represented in FIG. 1 as an asterisk (*). Note that the bits of string 10 are in sequential order, and that the chips of string 12 also are in sequential order, so that an equivalent way of describing the operation illustrated in the Figure is that product chip string 14 is generated by sequentially multiplying the data string by the binary code sequence, starting with the first bit of the string aligned with the first chip of the sequence (to produce the chip $D_1*C_1$), until the last bit of the string is aligned with the last chip of the sequence (to produce the chip $D_M*C_N$). In this manner, N chip frames are generated, within which the data bits appear in sequential order (unlike in the prior art, in which the order of the data bits within each chip frame is pseudo-randomized), and in which every data bit is modulated once by every binary code sequence chip. Note that each data bit is multiplied by a differently shifted version of the binary code sequence. If the binary code sequence is exactly self-orthogonal, it follows that, in the non-interleaved packet, N-chip sequences corresponding to different data bits are mutually orthogonal. In the absence of noise, the decoding process at the receiver, described below, rigorously eliminates interference from delayed multipath transmissions of the message. This is an advantage of the present invention over prior art methods such as that of Tachikawa et al., which are less immune than the present invention to multipath and inter-symbol interference.

In FIG. 1, M has been selected to be equal to QN+1. It will be appreciated that equivalent results are obtained by selecting M equal to QN−1: again, N chip frames are obtained, with the first product chip equal to $D_1*C_1$ and the last product chip equal to $D_M*C_N$, and every possible combination of a data bit and a binary code chip appearing once. Equivalent results also are obtained by selecting M equal to QN+S, where S is an integer, greater than 1 and less than N, that does not have a common factor with N. See, for example, Dilop V. Sarwate and Michael B. Pursley, "Cross-correlation properties of pseudorandom and related sequences", *Proc. IEEE* vol. 68 no. 5 p. 593 (1980). Again, N chip frames are obtained, with the first product chip equal to $D_1*C_1$ and the last product chip equal to $D_M*C_N$, and every possible combination of a data bit and a binary code chip appearing once.

Figure 2A:
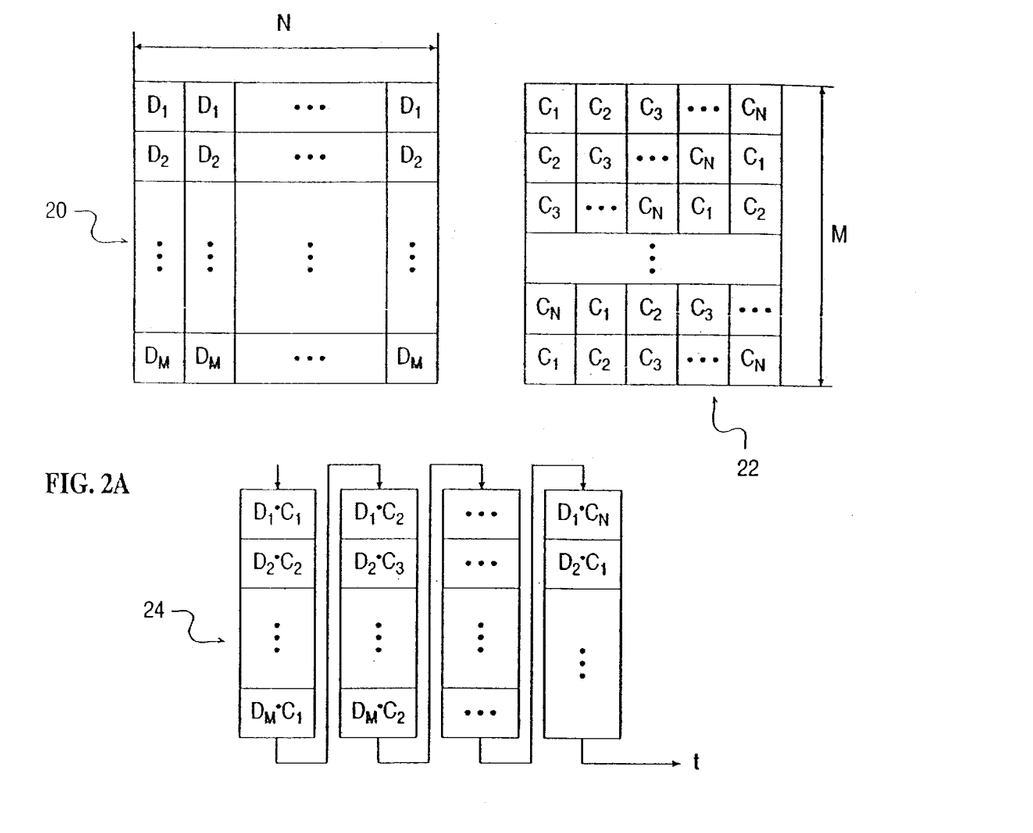
FIGS. 2A and 2B show an alternative schematic depiction of the interleaved multiplication scheme of the present invention.
Figure 2B:
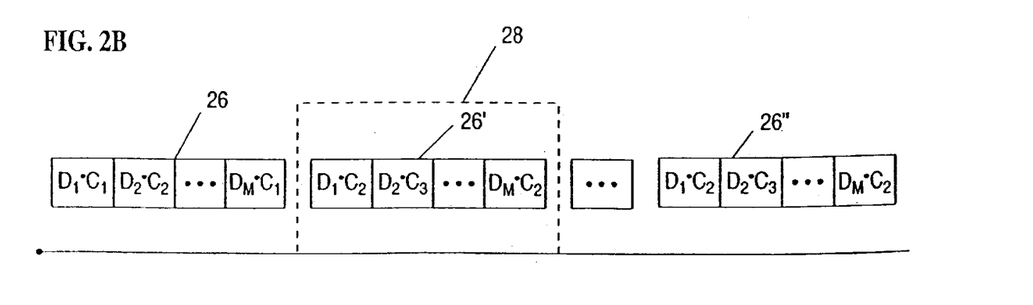

FIGS. 2A and 2B show another way of looking at the interleaved multiplication of the data string by the pseudorandom binary code sequence, in the special case of Q=1. In FIG. 2A, N duplicates of the data string of M bits $D_1$ through $D_M$ appear as the columns of an M×N matrix 20, and M duplicates of the binary code sequence of N chips $C_1$ through $C_N$ appear column-wise in an M×N matrix 22. The two matrices 20 and 22 are multiplied element by element to give a set of N columns 24, each of which constitutes one chip frame. The product chips of columns 24 are transmitted in the order shown by the arrows as a function of time t. FIG. 2B shows the transmitted packet as a function of time t, starting with the first chip frame 26 and the second chip frame 26' and ending with the last chip frame 26". Chip frame 26' is shown contaminated by a noise burst 28 whose duration is equal to the duration of the transmission of one chip frame. In noninterleaved DSSS, such a noise burst would render incomprehensible all of the chips corresponding to one or more data bits. In interleaved DSSS, as shown, noise burst 28 contaminates one product chip for each of the data bits, but all the other product chips are intact, so all of the data bits can be recovered at the receiver by simple statistical noise suppression methods.

Figure 3:
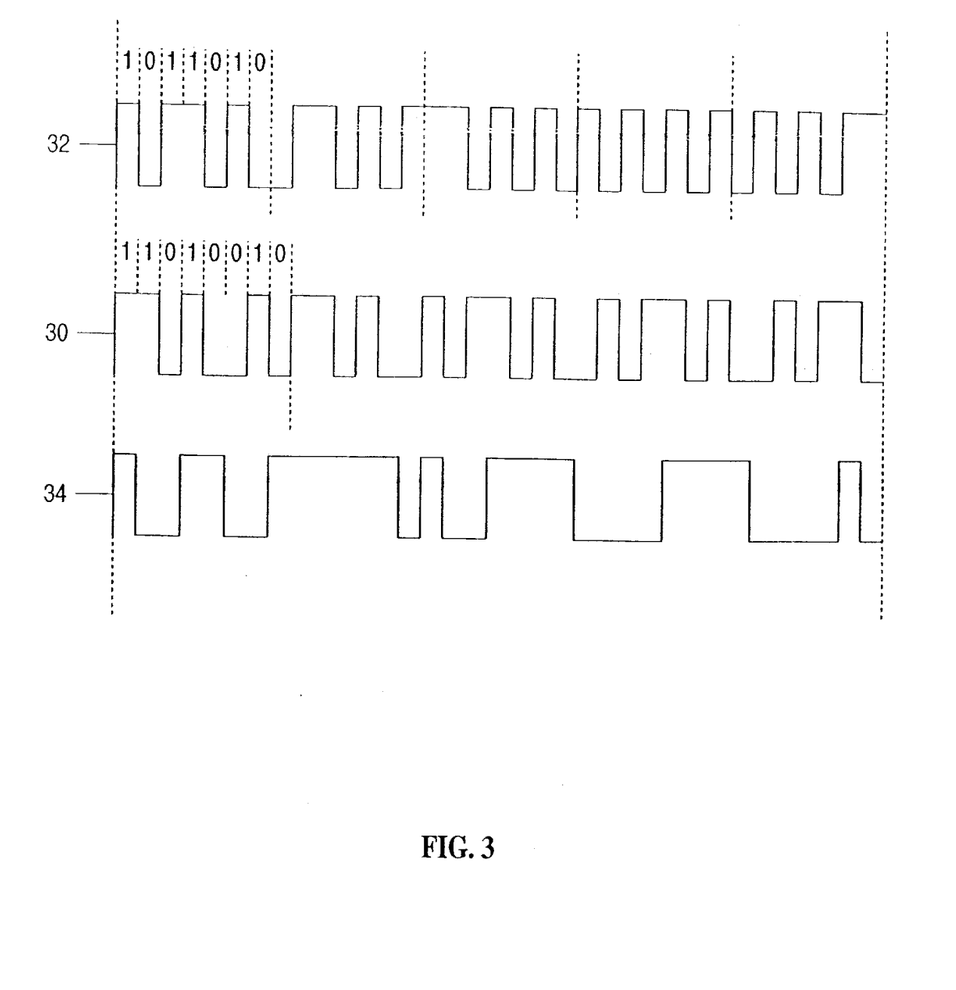
FIG. 3 shows a specific example of the interleaved multiplication of a message string by a pseudorandom binary code sequence.

FIG. 3 shows a specific example of the interleaved multiplication of an 8-bit message string 30 by a 7-chip pseudorandom binary code sequence 32 to produce a transmitted packet 34. 5 instances of binary code sequence 32 and slightly more than 4 instances of message string 30 are shown.

Figure 4:
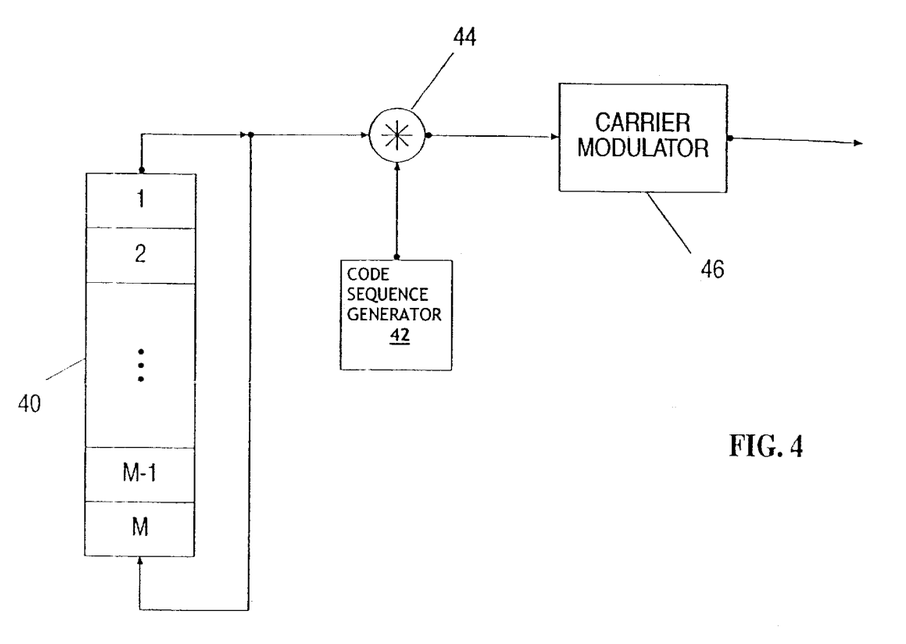
FIG. 4 is a flow diagram of an implementation of interleaved DSSS at a transmitter.

FIG. 4 is a flow diagram of one implementation of interleaved DSSS at a transmitter, according to the present invention. The M data bits of a message string are stored in a register 40. The N chips of a pseudorandom binary code sequence are generated repeatedly and sequentially by a code sequence generator 42. The M data bits are cycled repeatedly through a multiplier 44 where they are multiplied by the sequentially generated chips of the binary code sequence. The resulting packet is modulated onto the carrier wave in carrier modulator 46 and transmitted.

Figure 5:
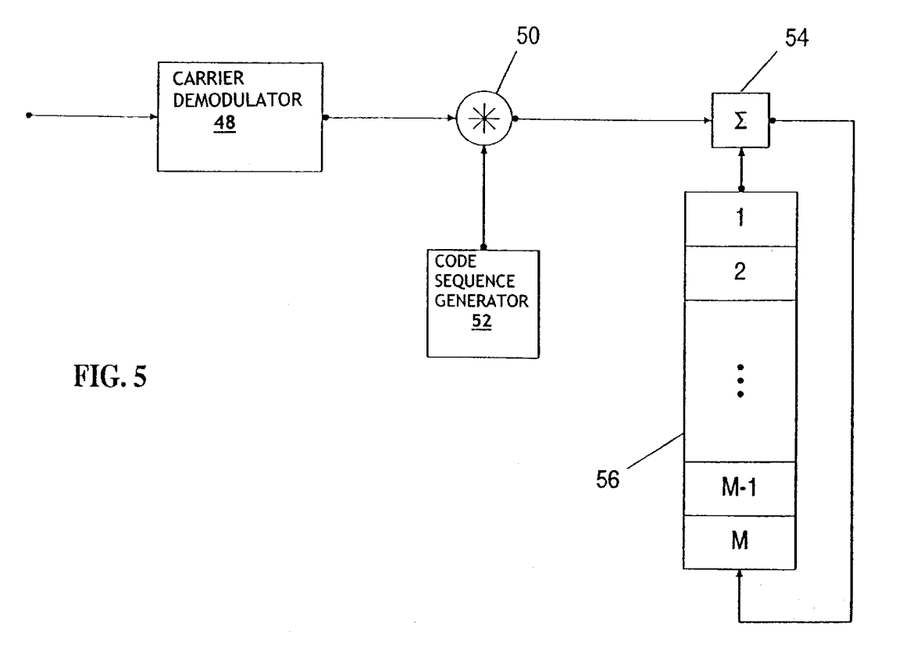
FIG. 5 is a flow diagram of the decoding of the transmission of FIG. 4.

Product chip string 14 is transmitted as such to the receiver. At the receiver, data string 10 is recovered by multiplying the received chip string (product chip string 14 contaminated by noise) as described above by binary code string 12. FIG. 5 is a flow diagram of an implementation of interleaved DSSS decoding, at a receiver, that corresponds to the encoding of FIG. 4. A first-in-first-out register 56 of M integers is initialized to all zeros. The received signal is demodulated in a carrier demodulator 48. The resulting demodulated received chip string is multiplied in a multiplier 50 by sequentially generated chips of the same pseudorandom binary code sequence, generated by a code sequence generator 52, as is used to encode the transmitted packet in FIG. 4. In fact, code sequence generators 42 and 52 are functionally identical. The resulting integers are added sequentially, in summer 54, to integers supplied cyclically from register 56, and the results of the addition are returned to register 56. After code sequence generator 52 has generated M instances of the binary code sequence, all N transmitted instances of all M data bits have been accumulated in register 56 in the proper order.

Figure 6:
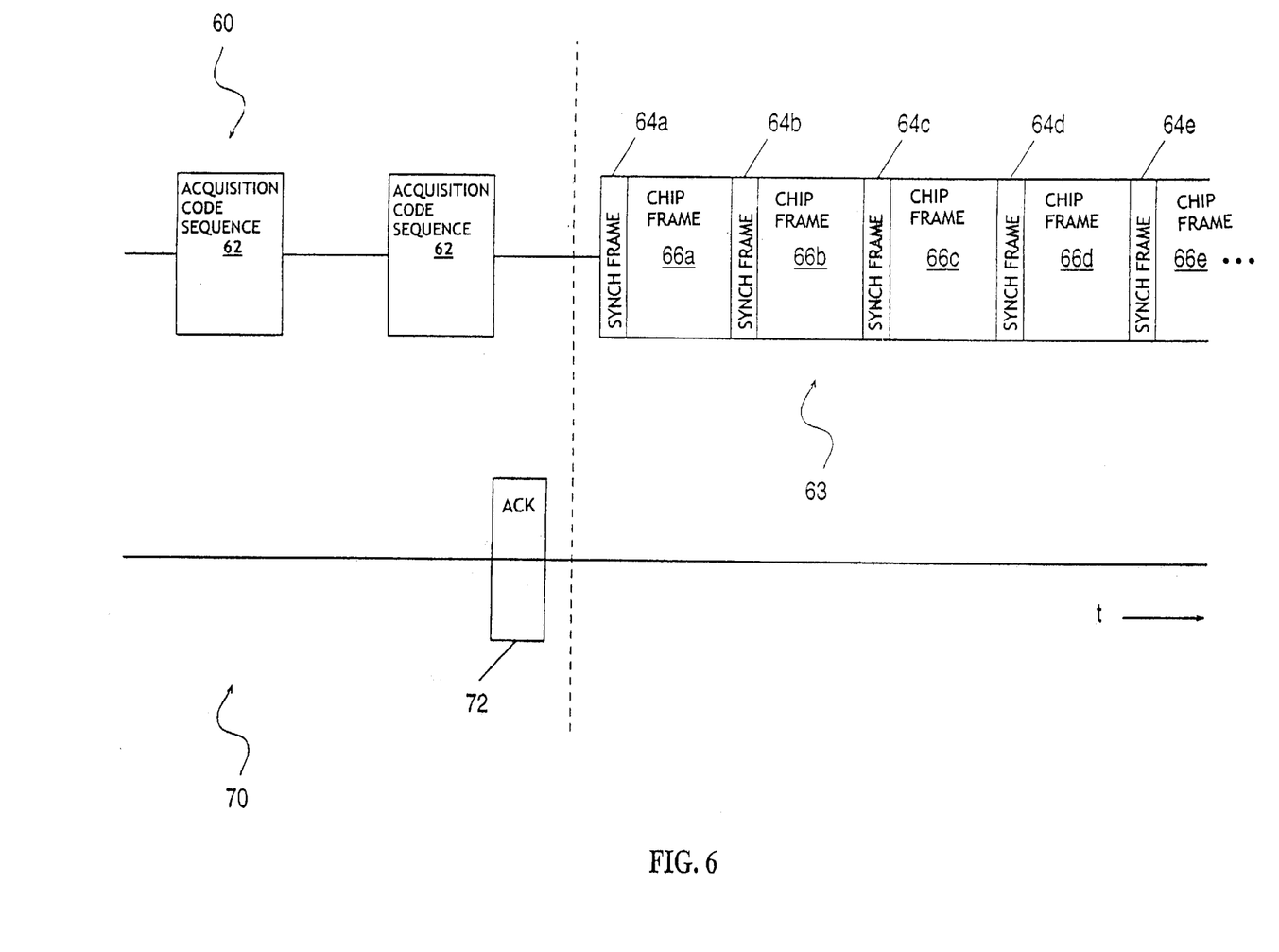
FIG. 6 is a schematic depiction of the synchronization signals.

In order for the decoding of FIG. 5 to be done correctly, the transmitter and the receiver must be synchronized. The scope of the present invention includes a synchronization method that is tailored specifically to interleaved DSSS. This method is illustrated schematically in FIG. 6, which shows the exchange of synchronization signals between a transmitter and a receiver as a function of time t according to the present invention, with a transmitter synchronization signal 60 being transmitted by the transmitter to the receiver and a receiver synchronization signal 70 being transmitted by the receiver to the transmitter. As is well known, the synchronization process in spread spectrum communication consists of two phases: acquisition, in which a gross synchronization, to within about one chip transmission interval, is performed; and tracking, in which a fine synchronization, to within a small fraction of a chip transmission interval, is performed. In FIG. 6, the time to the left of the dashed line represents acquisition and the time to the right of the dashed line represents tracking.

In the acquisition phase, the transmitter transmits one or more instances of an acquisition code sequence 62 of L bits. Preferably, acquisition code sequence 62 is a self-orthogonal, or approximately self-orthogonal, pseudorandom binary code sequence similar to the binary code sequence used for interleaving. Most preferably, the length L of acquisition code sequence 62 is considerably longer than the length N of the interleaving code sequence. For example, if N is 63, a typical value of L is 1023. Every receiver is provided with its own unique identifying code sequence of length L, all the identifying code sequences being approximately mutually orthogonal. For transmission to a particular receiver, acquisition code sequence 62 is chosen to have a high correlation with the identifying code sequence of the target receiver and a low correlation with all the other identifying code sequences. Each receiver cross-correlates received acquisition code sequences 62 with its own identifying code sequence. A receiver that obtains a cross-correlation function having a peak above an appropriate threshold uses the lag of that peak to perform gross synchronization, and transmits an acknowledgment 72 to the transmitter.

When the transmitter receives acknowledgment 72, it stops transmitting acquisition code sequences 62 and starts transmitting a packet 63 of chip frames. As shown in FIG. 6, packet 63 includes both chip frames of length M, of which the first 5 (66a, 66b, 66c, 66d and 66e) are shown in FIG. 6, and synchronization frames of length K, of which the first 5 (64a, 64b, 64c, 64d and 64e) are shown in FIG. 6. Preferably, the synchronization frames are self-orthogonal, or approximately self-orthogonal, pseudorandom binary code sequences similar to the binary code sequence used for interleaving. According to one embodiment of the present invention, all of the synchronization frames are identical, but they need not be identical, as long as the receivers know in what order to expect them. The synchronization frames are shown in FIG. 6 as preambles to the chip frames, but the synchronization frames may be inserted anywhere in the chip frames, or even appear as postambles.

Figure 7:
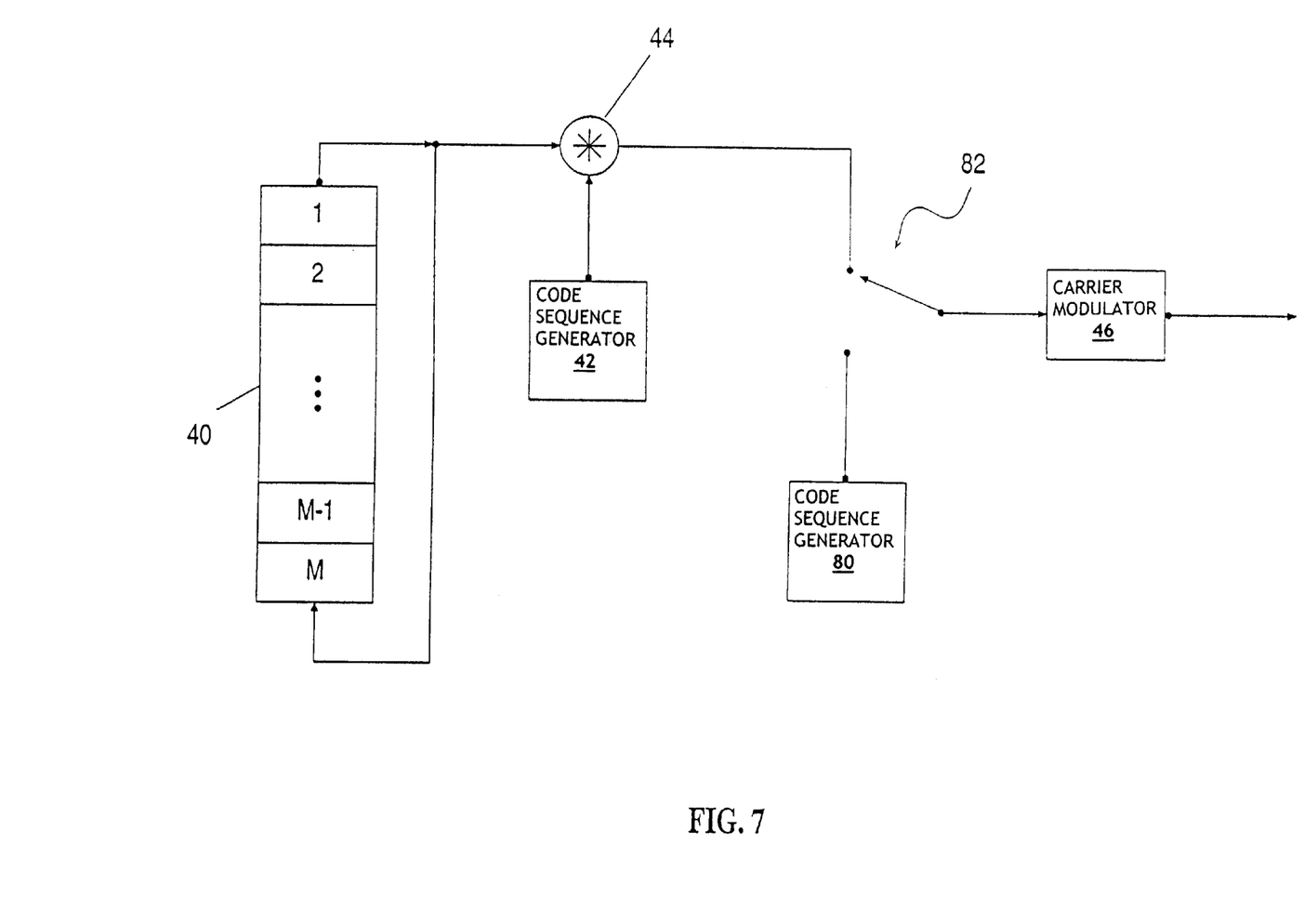
FIG. 7 is a flow diagram of a combined implementation of interleaved DSSS and tracking, at a transmitter.

FIG. 7 is a flow diagram of an implementation of this combined interleaved DSSS and tracking at a transmitter, in the case of all the synchronization frames being identical. As in FIG. 4, the M data bits of the message string are cycled through multiplier 44 and multiplied by sequentially generated chips of the binary code sequence generated by code sequence generator 42. Another code sequence generator 80 generates the synchronization frames. Switch 82 switches between an up position (as shown), in which chip frames are passed to carrier modulator 46 for transmission, and a down position, in which synchronization frames are passed to carrier modulator 46 for transmission. Initially, switch 82 is in the down position. The K chips of the synchronization frame 64a are transmitted. Switch 82 then is switched to the up position, and M data bits are cycled through multiplier 44 to create and transmit chip frame 66a. Switch 82 then is switched back to the down position, and the cycling of the data bits and the generation of the binary code sequence chips in code sequence generator 42 are suspended while the K chips of the next synchronization frame are transmitted. Switch 82 alternates in this manner, between the up position and the down position, until the entire packet is transmitted. Note that if K is a factor of M, the generation of synchronization frame chips need not be suspended while the chip frames are generated and transmitted; otherwise, the generation of synchronization frame chips are suspended while switch 82 is in the up position.

Alternatively, register 40 of FIG. 4 can be replaced by a register of M+N bits, with the first N bits set equal to 1's and the last M bits set equal to the data bits. The implementation of FIG. 4 then transmits expanded chip frames in which the first N chips are different versions (unshifted in the first expanded chip frame and shifted in subsequent expanded frames) of the binary code sequence used for interleaving; and in which the last M chips are the chips of the chip frame as generated before, without the synchronization frame. The receiver interprets the expanded chip frames as ordinary chip frames with synchronization frames prepended. In this way, the same binary sequence is used for both interleaving and synchronization.

Figure 8:
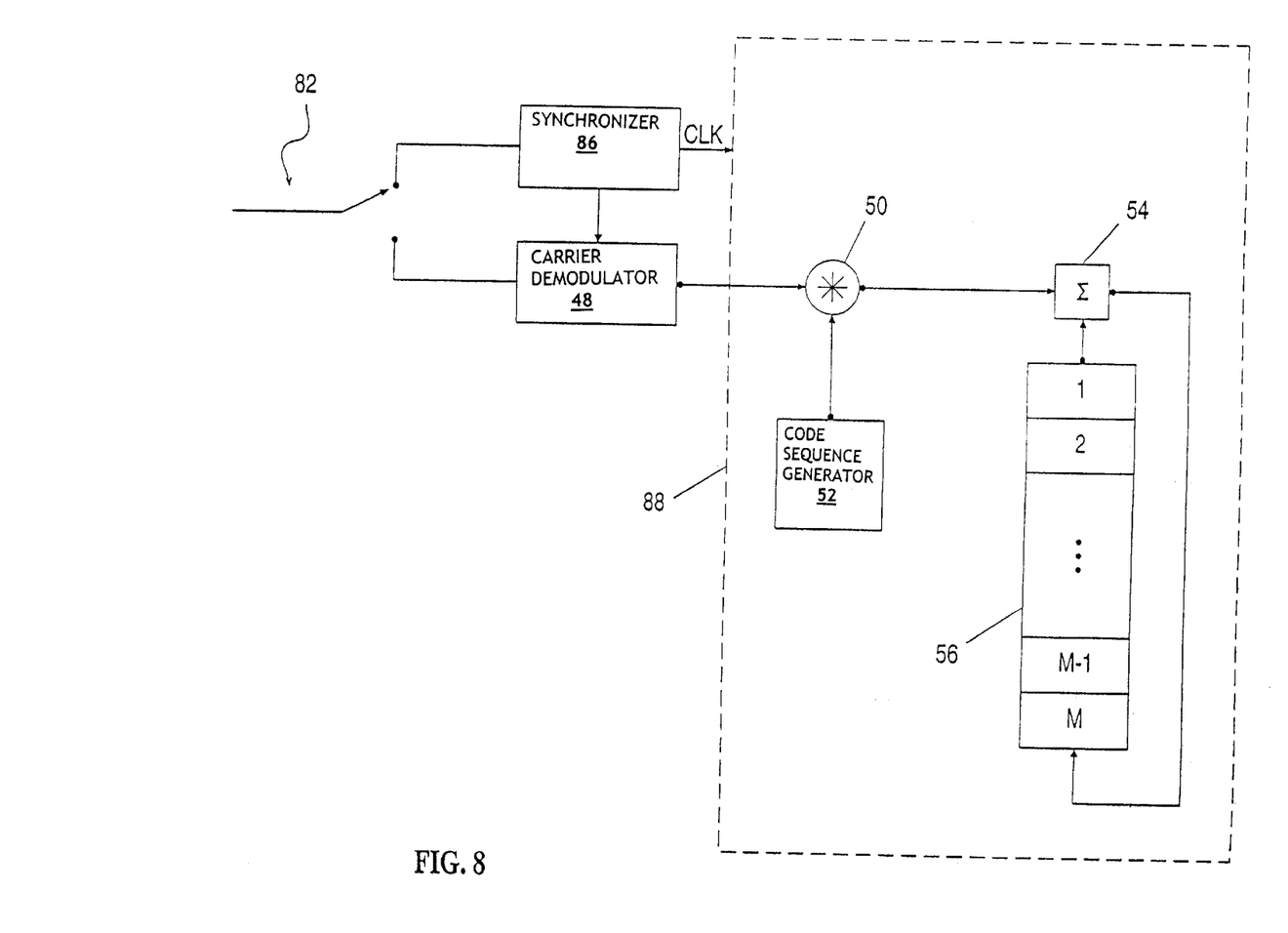
FIG. 8 is a flow diagram of a combined implementation of tracking and decoding, at a receiver.

FIG. 8 is a flow diagram of an implementation of combined tracking and interleaved DSSS decoding at a receiver, corresponding to the combined interleaved DSSS and tracking of FIG. 7. A switch 84 is set in either an up position, as shown, to direct received synchronization frames to a synchronizer 86, or a down position, to direct received chip frames to carrier demodulator 48 as in FIG. 5. Synchronizer 86 and demodulator 48 are partly analog and partly digital; indeed, the function of demodulator 48 is to convert the received analog signal to a digital signal. Dashed line 88 represents the exclusively digital system of the receiver. In particular, digital system 88 includes code sequence generator 52, register 56, multiplier 50 and summer 54. The functions of synchronizer 86 are as follows:

(a) to synchronize to the carrier wave so that demodulator 48 can demodulate the incoming signal;

(b) to synchronize the timing of the analog-to-digital conversion in demodulator 48 that provides the product integers to multiplier 50; and (c) to synchronize digital system 88 to the incoming message code, as symbolized by the arrow labeled "CLK".

It will be appreciated by those ordinarily skilled in the art that this synchronization method, including the transmission of acquisition code sequences and the insertion of synchronization frames among the chip frames, is not inherently restricted to the interleaving method of the present invention, but may be used together with any interleaved DSSS communications scheme.

While the invention has been described with respect to a limited number of embodiments, it will be appreciated that many variations, modifications and other applications of the invention may be made.

What is claimed is:

1. An improved method for transmitting a number M of data bits from a transmitter to a receiver, the method being of the type in which a plurality of chip frames are formed by multiplying each of the data bits by N of the chips of a pseudorandom binary interleaving code sequence, thereby producing a set of N product chips corresponding to each bit, and interleaving the product chips so that each chip frame includes a unique one of the product chips from each bit, the improvement comprising the steps of:

(a) selecting an integer Q;

(b) selecting N to be one less than a power of two;

(c) selecting M to be equal to an integer selected from the group of integers consisting of QN+1, QN−1 and QN+S, wherein S is an integer greater than 1, less than N and lacking a common factor with N;

(d) providing, at the transmitter and at the receiver, the pseudorandom binary interleaving code sequence, of N chips, selected from the group of sequences consisting of self-orthogonal sequences and approximately self-orthogonal sequences; and (e) sequentially multiplying, at the transmitter, each of the M data bits by each of the N chips of the pseudorandom binary interleaving code sequence, thereby producing a packet of N chip frames, said packet including NM product chips.

2. The method of claim 1, wherein said Q is selected equal to one.

3. The method of claim 1, wherein said pseudorandom binary interleaving code sequence is a gold code sequence.

4. The method of claim 1, further comprising the step of:

(f) sequentially multiplying, at the receiver, product integers corresponding to said product chips of said packet by each of N code integers corresponding to said N chips of said pseudorandom binary interleaving code sequence, thereby producing N sequences of received integers, each of said N sequences of received integers including M received integers.

5. The method of claim 4, further comprising the step of:

(g) accumulating, at the receiver, said N sequences of received integers, thereby producing a sequence of M accumulated integers.

6. The method of claim 1, further comprising the step of:

(f) transmitting at least one pseudorandom binary acquisition code sequence from the transmitter to the receiver.

7. The method of claim 6, wherein said at least one pseudorandom binary acquisition code sequence is selected from the group of sequences consisting of self-orthogonal sequences and approximately self-orthogonal sequences.

8. The method of claim 7, wherein said at least one pseudorandom binary acquisition code sequence is a gold code sequence.

9. The method of claim 6, further comprising the step of:

(g) transmitting an acknowledgment from the receiver to the transmitter.

10. The method of claim 1, further comprising the step of:

(f) including a synchronization frame in each of a plurality of said chip frames.

11. The method of claim 10, wherein said synchronization frames are identical.

12. The method of claim 10, wherein each of said synchronization frames is selected from the group of sequences consisting of self-orthogonal sequences and approximately self-orthogonal sequences.

13. The method of claim 12, wherein each of said synchronization frames is a gold code sequence.

14. The method of claim 10, wherein at least one of said synchronization frames is identical to the pseudorandom binary interleaving code sequence.

* * * * *